US012669583B2

(12) United States Patent
Chun et al.

(10) Patent No.: US 12,669,583 B2
(45) Date of Patent: Jun. 30, 2026

(54) METHOD OF DETECTING ROAD-CURB WITH LiDAR SENSOR AND ROAD-CURB DETECTING APPARATUS FOR PERFORMING THE METHOD

(71) Applicant: Vueron Technology Co., Ltd, Seoul (KR)

(72) Inventors: Changhwan Chun, Seoul (KR); Seungyong Lee, Goyang-si (KR)

(73) Assignee: Vueron Technology Co., Ltd, Seoul (KR)

( * ) Notice: Subject to any disclaimer, the term of this patent is extended or adjusted under 35 U.S.C. 154(b) by 1248 days.

(21) Appl. No.: 17/462,469

(22) Filed: Aug. 31, 2021

(65) Prior Publication Data

US 2022/0404467 A1     Dec. 22, 2022

(30) Foreign Application Priority Data

Jun. 17, 2021     (KR) ........................ 10-2021-0078982

(51) Int. Cl.
G01S 7/48 (2006.01)
G01S 17/89 (2020.01)
G01S 17/931 (2020.01)

(52) U.S. Cl.
CPC ............ G01S 7/4808 (2013.01); G01S 17/89 (2013.01); G01S 17/931 (2020.01)

(58) Field of Classification Search
CPC .......... G01S 7/48; G01S 17/89; G01S 17/931; B60W 40/02
See application file for complete search history.

(56) References Cited

U.S. PATENT DOCUMENTS

| | | | | |
|---|---|---|---|---|
| 12,046,252 B2 * | 7/2024 | Karri | ................... | G10L 21/0216 |
| 2020/0242820 A1 * | 7/2020 | Kim | ...................... | G01S 17/931 |
| 2021/0333397 A1 * | 10/2021 | Ghallabi | ................. | G01S 17/89 |

FOREIGN PATENT DOCUMENTS

| | | | | |
|---|---|---|---|---|
| KR | 10-2019-0062689 A | | 6/2019 |
| KR | 20190062689 A | * | 6/2019 |
| KR | 10-2020-0094384 A | | 8/2020 |

OTHER PUBLICATIONS

Qingfeng Myeong-Moon; "Geometry and classification of curb"; http://blog.daum.net/2020view/6658; Jul. 23, 20214; 6 pages (with English Translation).
2017 Seoul City Street Design and Management Manual; Feb. 2017; 130 pages (with partial machine translation).

* cited by examiner

*Primary Examiner* — Erin D Bishop
*Assistant Examiner* — Mahmoud M Kazimi
(74) *Attorney, Agent, or Firm* — Bridgeway IP Law Group, PLLC; Jihun Kim

(57) ABSTRACT

A method of detecting a road-curb that is performed by a road-curb detecting apparatus is provided. The method includes obtaining points around a lidar sensor from the lidar sensor, arranging the points in a plurality of cells into which a circular grid map is divided, and detecting the road-curb based on the points arranged in the plurality of cells.

14 Claims, 11 Drawing Sheets

AREA 1
(22)

AREA 3
(26)

AREA 2
(24)

METHOD OF DETECTING ROAD-CURB WITH LiDAR SENSOR AND ROAD-CURB DETECTING APPARATUS FOR PERFORMING THE METHOD

CROSS-REFERENCE TO RELATED APPLICATION

This application claims priority to Korean Patent Application No. 10-2021-0078982, filed on Jun. 17, 2021. The entire contents of the application on which the priority is based are incorporated herein by reference.

TECHNICAL FIELD

The present disclosure relates to a method of detecting a road-curb on a road with a light detection and ranging (LiDAR) sensor and a road-curb detecting apparatus for performing the method.

BACKGROUND

In performing autonomous driving, an urban area has a complex and difficult terrain to understand and perceive its environment. In order to perform the autonomous driving in such a complex and difficult urban environment, effectively detecting boundaries between a road area where the vehicle can travel and a non-road area becomes significant.

A road-curb is a boundary stone installed in connection with the boundary, for example, between a driveway (road surface) and a sidewalk/drinking fountain for pedestrian safety, road surface drainage, visual guidance, boundaries of driveway, and maintenance. The road-curb is a very important zone that separates the road area from the non-road area. Thus, by detecting the road-curb, it is possible to understand the area where the vehicle can travel. In addition, in performing vehicle localization in the autonomous driving, the position of the vehicle can be accurately identified by comparing road-curb position information stored in advance in the high-definition map (HD map) with road-curb position information around the moving vehicle.

As such, the road-curb has an important feature that can be used to determine the area where the vehicle can travel and further to localize the vehicle. There are many road-curbs in the urban area, and the accurate detection of the road-curb positions is essential for performing the safe autonomous driving.

As a conventional example, a road-curb detecting method using a camera is provided to detect the road-curb. In the road-curb detecting method using the camera, for example, after determining an area where the vehicle can travel by using the camera, the boundary was detected as the road-curb or the road-curb was detected by using edge information. However, this method has a disadvantage in that the camera is greatly affected by changes in illuminance, so that the road-curb is well detected only during the daytime when the weather is good. In addition, since there are many cases in which the road-curb facing the camera has a shape similar to that of the lane, there is a problem that the lane is mistakenly detected as the road-curb.

As another conventional example, a road-curb detecting method using lidar data is provided to compare the same layers based on information of layers of points. However, this method has problems that the algorithm can be applied only when the sensor input information or layer information is known in advance, and the processing speed is low because information on all points is used.

SUMMARY

In view of the above, the present disclosure provides a method of detecting a road-curb on a road without layer information or at a high speed by using point data.

In accordance with an aspect of the present disclosure, there is provided a method of detecting a road-curb that is performed by a road-curb detecting apparatus, the method including: obtaining points around a lidar sensor from the lidar sensor; arranging the points in a plurality of cells into which a circular grid map is divided; and detecting the road-curb based on the points arranged in the plurality of cells.

Further, the detecting of the road-curb may include determining, among the plurality of cells, a first cell in which a difference in heights between points is within a first predetermined range as a road-curb candidate cell.

The detecting of the road-curb may further include determining the road-curb cell based on a second cell and a third cell, each of which has a value of an angular component on the circular grid map that is the same as that of the first cell. Further, the determining of the road-curb cell may include selecting a cell having a value of a radius component on the circular grid map that is smaller than that of the first cell as the second cell, selecting a cell having a value of a radius component on the circular grid map that is greater than that of the first cell as the third cell, and determining the first cell as the road-curb cell if a height difference between a point having the smallest height in the second cell and a point having the smallest height in the third cell is within a second predetermined range.

Further, the second cell and the third cell may be adjacent to the first cell.

Further, a distance between the second cell and the third cell may be shorter than or equal to a predetermined distance.

The detecting of the road-curb may further include determining, as road-curb candidate points, points respectively having heights within a third predetermined range among points arranged in the road-curb cell.

The detecting of the road-curb may further include performing a first line fitting process using the road-curb candidate points, and detecting a first road-curb using first points that are inlier points obtained in the first line fitting process if the number of the first points is greater than or equal to a predetermined value.

The detecting of the road-curb may further include performing a second line fitting process using second points remaining after removing the first points from among the road-curb candidate points, and detecting a second road-curb using third points that are inlier points obtained in the second line fitting process if the number of the third points is greater than or equal to the predetermined value.

In accordance with another aspect of the present disclosure, there is provided a non-transitory computer-readable storage medium including computer-executable instructions which cause, when executed by a processor, the processor to perform a method of detecting a road-curb that is performed by a road-curb detecting apparatus, the method including: obtaining points around a lidar sensor from the lidar sensor; arranging the points in a plurality of cells into which a circular grid map is divided; and detecting the road-curb based on the points arranged in the plurality of cells.

In accordance with still another aspect of the present disclosure, there is provided a road-curb detecting system including: a lidar sensor to obtain points around the lidar sensor; and a road-curb detecting apparatus to arrange the points in a plurality of cells into which a circular grid map is divided and to detect a road-curb based on the points arranged in the plurality of cells.

According to the aspects of the present disclosure, by arranging the point data received from the lidar sensor in divided cells on a circular grid map to detect the road-curb, it is not necessary to use all the point data so that the road-curb may be detected rapidly. In addition, by using the circular grid map, it may accurately detect the road-curb on the road regardless of a direction of the road-curb. Therefore, it is possible to improve the safety of autonomous driving through accurate road-curb detection and provide a processing technique suitable for a real-time operation of a control system through the rapid data processing.

DETAILED DESCRIPTION OF THE EMBODIMENTS

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

Figure 1:
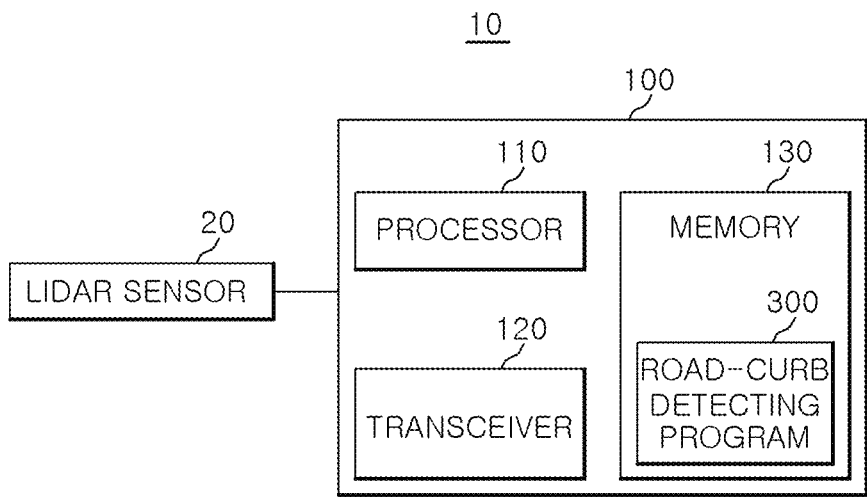
FIG. 1 shows a block diagram showing an example of a road-curb detecting system according to an embodiment of the present disclosure.

FIG. 1 shows a block diagram showing an example of a road-curb detecting system 10 according to an embodiment of the present disclosure.

Referring to FIG. 1, the road-curb detecting system 10 may include a lidar sensor 20 and a road-curb detecting apparatus 100.

In the present disclosure, for the sake of convenience of description, a case where the road-curb detecting system 10 is mounted on a driving vehicle with which one or more lidar sensors are equipped (hereinafter, simply referred to as a vehicle) is mainly described. However, the present disclosure is not limited thereto, and the road-curb detecting system 10 may be mounted on an unmanned moving object such as a drone or other movable objects such as a vehicle, a motorcycle, a flying vehicle, and the like as well as the driving vehicle with the lidar sensors such as an autonomous vehicle.

In addition, in the present disclosure, a case where the lidar sensor 20 is provided separately from the road-curb detecting apparatus 100 to transmit point data to the road-curb detecting apparatus 100 is mainly described. However, the present disclosure is not limited thereto and, for example, the road-curb detecting apparatus 100 may include the lidar sensor 20. In this case, the lidar sensor 20 may transmit the point data to a road-curb detecting program 300 to be described later through internal signaling.

The lidar sensor 20 may emit a laser beam (light pulse) in a predetermined direction and receive a reflected (or back-scattered) laser beam from surrounding terrain and objects. The lidar sensor 20 may collect point data through the reflected laser beam. Here, the point data may be a point cloud of individual points belonging to a certain coordinate system. In a three-dimensional coordinate system, a point is usually defined by X, Y, and Z coordinates, and is often used to indicate a surface of an object.

The road-curb detecting apparatus 100 may receive the point data from the lidar sensor 20 and use the received point data to detect a road-curb around the road-curb detecting apparatus 100 or around the vehicle on which the road-curb detecting apparatus 100 is mounted.

Specifically, the road-curb detecting apparatus 100 may use the X, Y, and Z coordinates of each point data received from the lidar sensor 20 to detect a position of a road-curb line around the lidar sensor 20 or around the vehicle on which the lidar sensor 20 is mounted.

In this connection, the road-curb detecting apparatus 100 may include a processor 110, a transceiver 120, and a memory 130.

The processor 110 may control the overall operation of the road-curb detecting apparatus 100.

The processor 110 may receive the point data from the lidar sensor 20 through the transceiver 120.

In the present disclosure, a case where the road-curb detecting apparatus 100 receives the point data through the transceiver 120 is mainly described. However, the present disclosure is not limited thereto and, for example, the road-curb detecting apparatus 100 may include an input/output device (not shown), and may receive the point data through the input/output device. Alternatively, for example, the road-curb detecting apparatus 100 may include the lidar sensor 20 to generate the point data in the road-curb detecting apparatus 100.

The memory 130 may store the road-curb detecting program 300 and information used for executing the road-curb detecting program 300.

In the present disclosure, the road-curb detecting program 300 may be software including instructions that are programmed to detect a road-curb by using information of the point data.

The processor 110 may load the road-curb detecting program 300 and the information used for the execution of the road-curb detecting program 300 from the memory 130.

Further, the processor 110 may execute the road-curb detecting program 300 to detect the road-curb located around the road-curb detecting apparatus 100 using position information obtained from the received point data.

Figure 2:
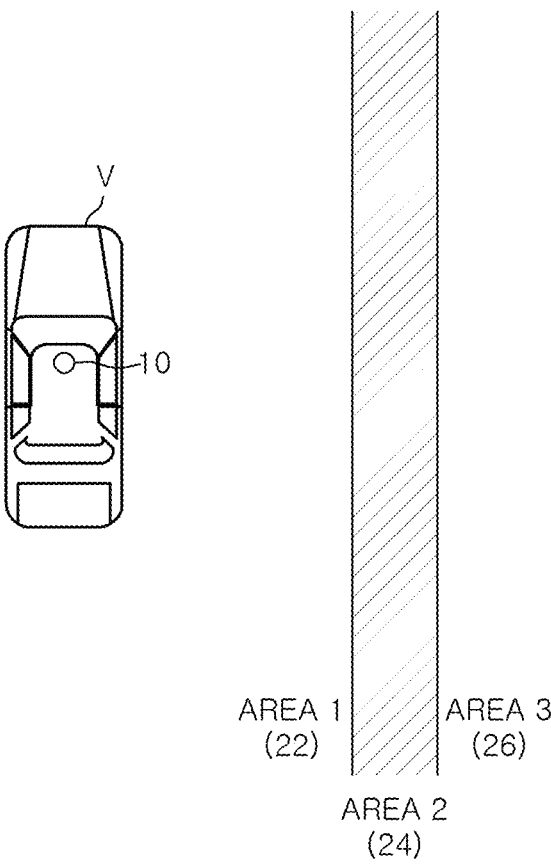
FIG. 2 shows an example of a position of the road-curb on a road.

FIG. 2 shows an example of the position of the road-curb on the road.

Referring to FIGS. 1 and 2, the vehicle V having the road-curb detecting system 10 may travel. A second area 24 including the road-curb on the road is located between a first area 22 including a driveway through which the vehicle V or the road-curb detecting system 10 may travel and a third area 26 including a sidewalk on the road. In other words, the first area 22, the second area 24, and the third area 26 are located in that order from the vehicle V or the road-curb detecting system 10, so that the road-curb detecting system 10 may detect the road-curb by using these features.

In the present disclosure, a case where the road-curb detecting system 10 is mounted on the vehicle V is mainly described. However, the present disclosure is not limited thereto and, for example, the road-curb detecting apparatus 100 of the road-curb detecting system 10 may be provided in a space independent of the vehicle V.

Figure 3:
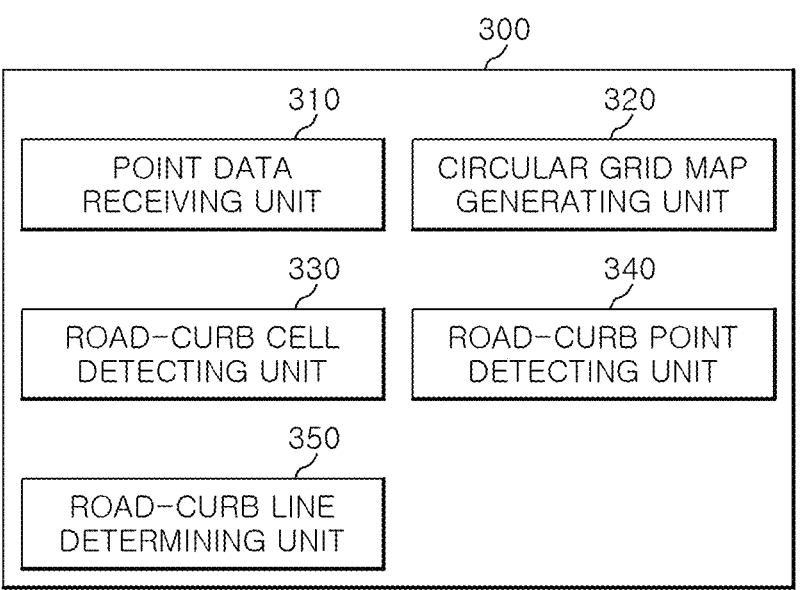
FIG. 3 shows a block diagram conceptually showing an example of functions of a road-curb detecting program according to the embodiment of the present disclosure.

FIG. 3 shows a block diagram conceptually showing an example of functions of the road-curb detecting program 300 according to the embodiment of the present disclosure.

Referring to FIGS. 1 and 3, the road-curb detecting program 300 may include a point data receiving unit 310, a circular grid map generating unit 320, a road-curb cell detecting unit 330, a road-curb point detecting unit 340, and a road-curb line determining unit 350.

The point data receiving unit 310 may receive point data collected by the lidar sensor 20.

The point data receiving unit 310, the circular grid map generating unit 320, the road-curb cell detecting unit 330, the road-curb point detecting unit 340, and the road-curb line determining unit 350 shown in FIG. 3 are conceptually divided in order to easily explain the functions of the road-curb detecting program 300. However, the present disclosure is not limited thereto. For example, the functions of the point data receiving unit 310, the circular grid map generating unit 320, the road-curb cell detecting unit 330, the road-curb point detecting unit 340, and the road-curb line determining unit 350 may be integrated or separated, and may be implemented as a series of instructions included in one program.

Figure 4:
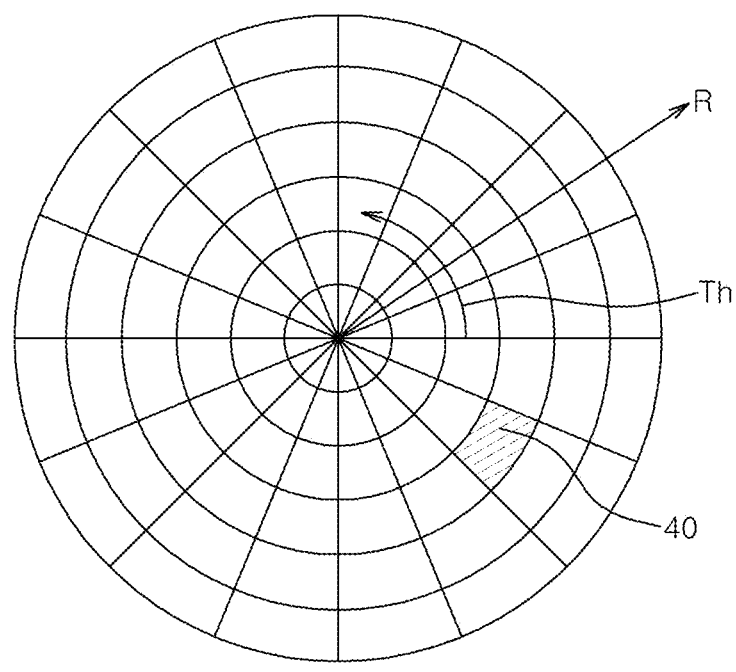
FIG. 4 shows an example of a generated circular grid map according to the embodiment of the present disclosure.

FIG. 4 shows an example of a generated circular grid map according to an embodiment of the present disclosure.

Referring to FIGS. 3 and 4, the circular grid map generating unit 320 may generate a circular grid map and further generate cells into which the circular grid map is divided. For example, the circular grid map generating unit 320 may generate a circular grid map in which the lidar sensor 20 is positioned at a center. For the sake of convenience of description, in the present disclosure, a case where the lidar sensor 20 is positioned at the center of the circular grid map is mainly described. However, the present disclosure is not limited thereto and, for example, the road-curb detecting apparatus 100 or a center of the vehicle V may be positioned at the center of the circular grid map.

A coordinate system of the circular grid map may include a radius component (magnitude of a radius) indicated by a rho R and an angular component indicated by a theta Th. Here, the theta Th component indicates a magnitude of an angle measured in a counterclockwise direction from 0 degrees on the positive x-axis in the Cartesian coordinate system.

In addition, the circular grid map generating unit 320 may generate a plurality of cells 40 by dividing the circular grid map by a predetermined unit distance and a predetermined unit angle. The circular grid map generating unit 320 may place the point data received from the point data receiving unit 310 into each of the generated cells 40.

The circular grid map has an advantage in easy data processing for any direction compared to a rectangular grid map or a square grid map. In addition, in a road-curb detecting method using the circular grid map, the size of the cell 40 increases as a distance from the road-curb detecting system 10 in the rho R direction (radial direction) increases. Thus, it is advantageous in that the data processing may be performed according to the distribution of the received point data. Further, if the circular grid map is used in the road-curb detecting method according to the embodiment of the present disclosure, it is advantageous in that the road-curb may be accurately detected even when the road-curb line is formed perpendicular to the road as well as when the road-curb line is formed parallel to the road.

Hereinafter, a method of detecting a road-curb candidate cell or a road-curb point will be described in detail below.

Figure 5:
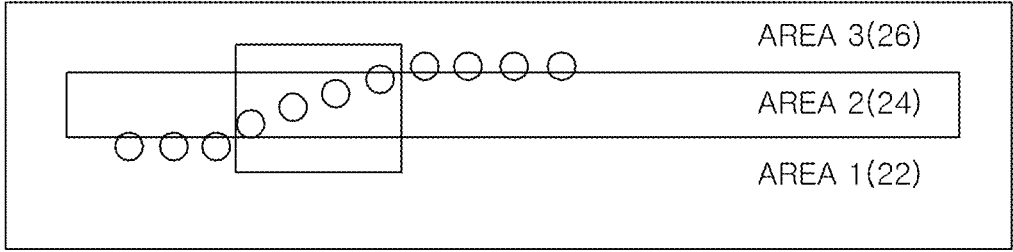
FIG. 5 shows an example of a point arrangement on an area of each of a road-curb, a driveway, and a sidewalk to detect a road-curb candidate cell according to the embodiment of the present disclosure.

FIG. 5 shows an example of a point arrangement on an area of each of a road-curb, a driveway, and a sidewalk to detect the road-curb candidate cell according to the embodiment of the present disclosure.

Referring to FIG. 5, the first area 22, the second area 24, and the third area 26 may be located in that order, and points may be arranged in each area. In this case, a difference in heights between the first area 22 and the third area 26 may be within a predetermined range. The predetermined range may be determined according to the curb height standards for each country. For example, the road-curb in Republic of Korea is specified to have a height of 15 cm to 30 cm, referring to Article 16 (2), etc. of the Rules about the Road Structure and Facility Standards in Republic of Korea. Therefore, the road-curb in Republic of Korea may be constructed within the height range of 15 cm to 30 cm according to the aforementioned standards.

Accordingly, the difference in heights between the first area 22 and the third area 26 is within the predetermined range that is determined on the basis of the second area 24 including the road-curb. According to the embodiment, the road-curb detecting apparatus 100 may detect the road-curb by using such a difference in heights between the first area 22 and the third area 26.

Referring to FIGS. 3 and 5, according to the embodiment, the road-curb point detecting unit 340 may compare the heights of the points arranged in the first area 22, the second area 24, and the third area 26.

Figure 6:
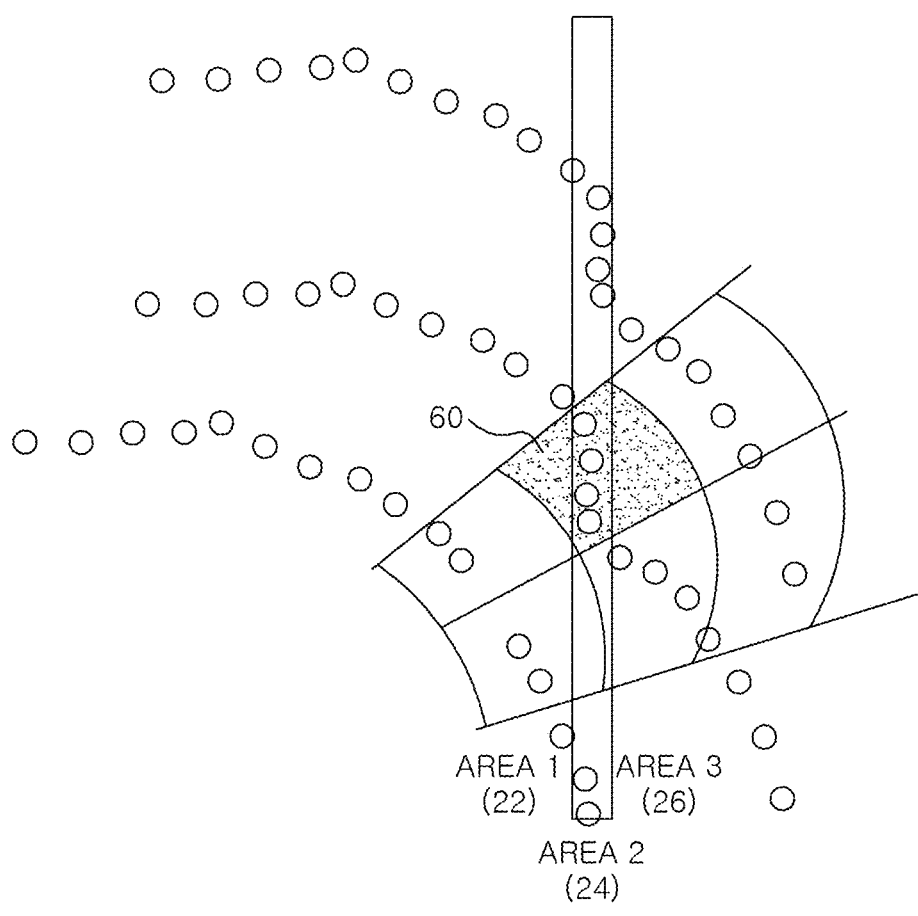
FIG. 6 shows an example of a method of detecting the road-curb candidate cell according to the embodiment of the present disclosure.

FIG. 6 shows an example of a method of detecting the road-curb candidate cell according to the embodiment of the present disclosure.

Referring to FIGS. 3 and 6, the road-curb cell detecting unit 330 may compare heights of points arranged in each cell and determine the largest height as $h_{max}$ and the smallest height as $h_{min}$. The road-curb cell detecting unit 330 may select, as a road-curb candidate cell 60, a cell in which a difference between $h_{max}$ and $h_{min}$ is within the predetermined range. In other words, the road-curb candidate cell satisfies the following equation 1:

$$a < h_{max} - h_{min} < b \qquad \text{Equation 1}$$

where a and b are height values that are determined based on the height of the road-curb specified by laws or regulations. For example, according to the embodiment, the height value 'a' may be 15 cm and the height value 'b' may be 30 cm.

In other words, the road-curb cell detecting unit 330 detects a cell in which the road-curb is likely to exist on the road as the road-curb candidate cell 60.

Figure 7:
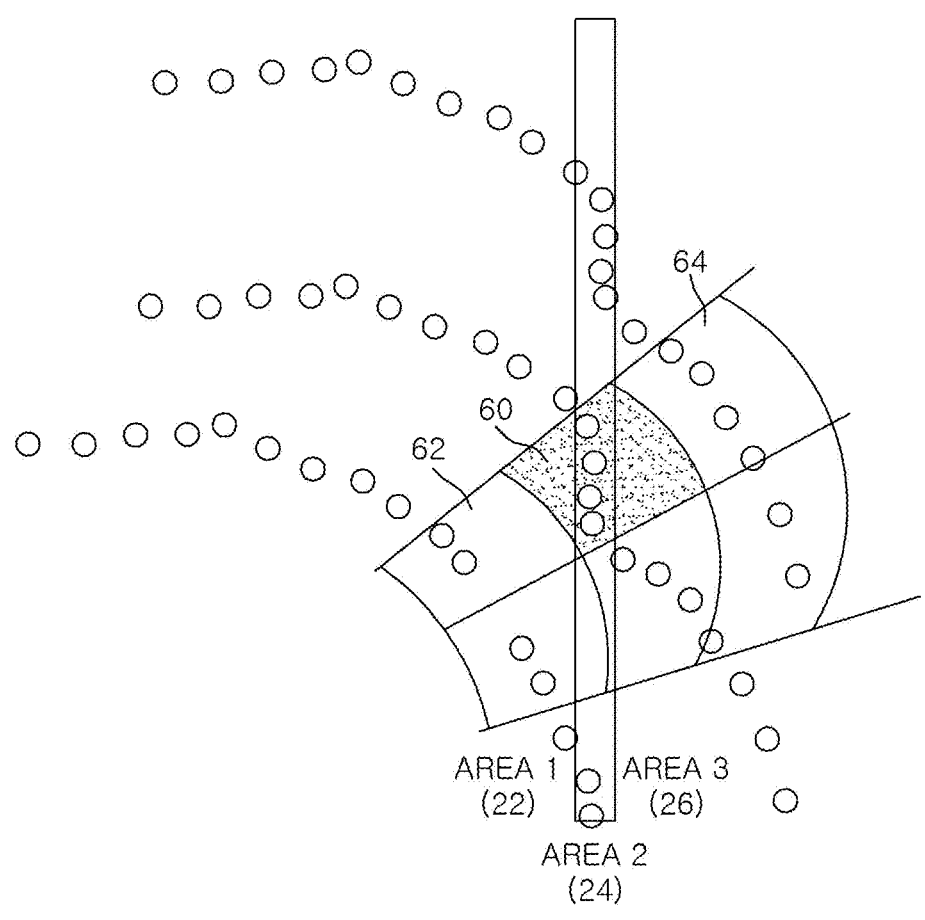
FIG. 7 shows an example of a method of detecting the road-curb cell by comparing heights of points arranged in cells adjacent to the road-curb candidate cell according to the embodiment of the present disclosure.

FIG. 7 shows an example of a method of detecting the road-curb cell by comparing heights of points arranged in cells adjacent to the road-curb candidate cell 60 according to the embodiment of the present disclosure.

Referring to FIGS. 3, 4, and 7, the road-curb cell detecting unit 330 may select, as cells to be used to compare heights of points, a second cell 62 having a larger rho R compared to the rho value of the road-curb candidate cell 60 and a third cell 64 having a smaller rho R compared to the rho value of the road-curb candidate cell 60 while the second cell 62 and the third cell 64 have the same theta Th on a circular grid map and are positioned adjacent to the road-curb candidate cell 60. Subsequently, the road-curb cell detecting unit 330 may detect a point having the smallest height among points in the second cell 62 and a point having the smallest height among points in the third cell 64. Then, the road-curb cell detecting unit 330 may determine the smallest height in the second cell 62 as h2 and the smallest height in the third cell 64 as h3.

If the road-curb candidate cell 60 is a cell where the road-curb is actually positioned, the second cell 62 and the third cell 64 which are adjacent to the road-curb candidate cell 60 may correspond to the first area 22 where the driveway is positioned and the third area 26 where the sidewalk is positioned, respectively, because the first area 22, the second area 24, and the third area 26 are located in that order. Therefore, since the difference between h2 and h3 may have a value similar to the height of the second area 24 where the road-curb is positioned, the road-curb cell detecting unit 330 may determine the road-curb candidate cell 60 as the road-curb cell if the difference between h2 and h3 satisfies the following equation 2:

$$c < h3 - h2 < d \qquad \text{equation 2}$$

where c and d are height values that are determined based on the height of the road-curb specified by laws or regulations. For example, according to the embodiment, the height value 'c' may be 15 cm and the height value 'd' may be 30 cm.

Figure 8:
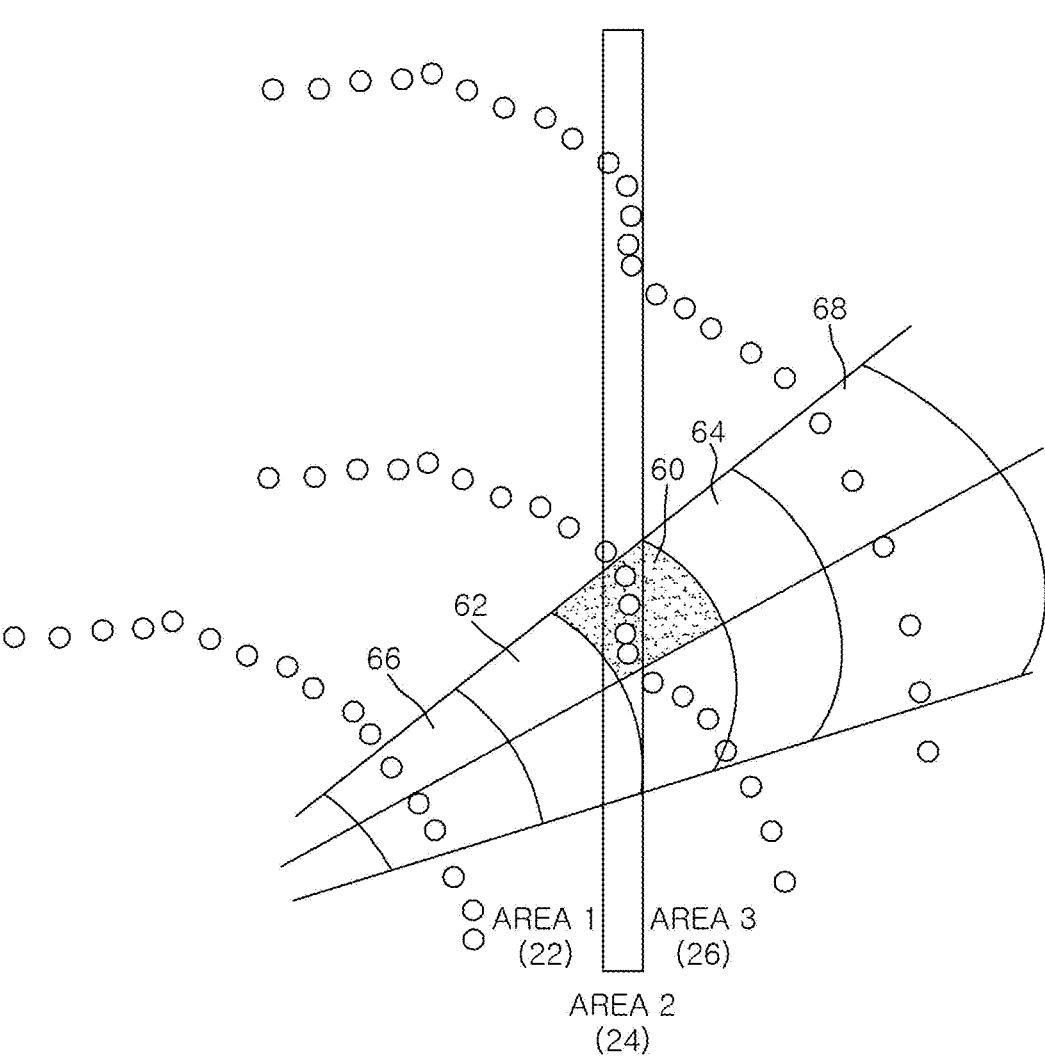
FIG. 8 shows an example of a method of detecting the road-curb cell through additional cell comparison in a case where no point is arranged in a cell adjacent to the road-curb candidate cell according to the embodiment of the present disclosure.

FIG. 8 shows an example of a method of detecting the road-curb cell through additional cell comparison if no point is arranged in a cell adjacent to the road-curb candidate cell 60 according to the embodiment of the present disclosure.

Referring to FIGS. 3, 4 and 8, if no point is arranged in the second cell 62, the road-curb cell detecting unit 330 may select a fourth cell 66 closest to the second cell 62 from among cells in each of which one or more points are arranged and the value of the theta Th is the same but the value of the rho R is smaller compared to those of the second cell 62. Thereafter, the road-curb cell detecting unit 330 may determine the smallest height among the heights of points arranged in the fourth cell 66 as h4. Alternatively, the road-curb cell detecting unit 330 may determine h4 of the fourth cell 66 in advance. In other words, if there is no fourth cell 66 in which a point is arranged, the road-curb cell detecting unit 330 may use the predetermined h4.

In addition, if no point is positioned in the third cell 64, the road-curb cell detecting unit 330 may select a fifth cell 68 closest to the third cell 64 from among cells in each of which one or more points are arranged and the value of the theta Th is the same but the value of the rho R is larger compared to those of the third cell 64. Thereafter, the road-curb cell detecting unit 330 may determine the smallest height among heights of points arranged in the fifth cell 68 as h5.

In this case, if the following equation 3 is satisfied, the road-curb cell detecting unit 330 may determine the road-curb candidate cell 60 as the road-curb cell:

$$e < h5 - h4 < f \qquad \text{Equation 3}$$

where e and f are height values that are determined based on the height of the road-curb specified by laws or regulations. For example, according to the embodiment, the height value 'e' may be 15 cm and the height value 'f' may be 30 cm.

Further, according to the embodiment, the road-curb cell detecting unit 330 may measure a distance between the selected fourth cell 66 and the selected fifth cell 68. For example, if the distance between centers of the fourth cell 66 and the fifth cell 68 is greater than or equal to a predetermined distance (e.g., a distance of 1 m), the road-curb candidate cell 60 may not be determined as the road-curb cell. This is because, if the distance between the fourth cell 66 and the fifth cell 68 that are used for height comparison is greater than or equal to the predetermined distance, there is a high possibility that there is a height change in the driveway area or sidewalk area, so that it is difficult to make an accurate determination due to the height change other than the height change in the road-curb.

Figure 9A:
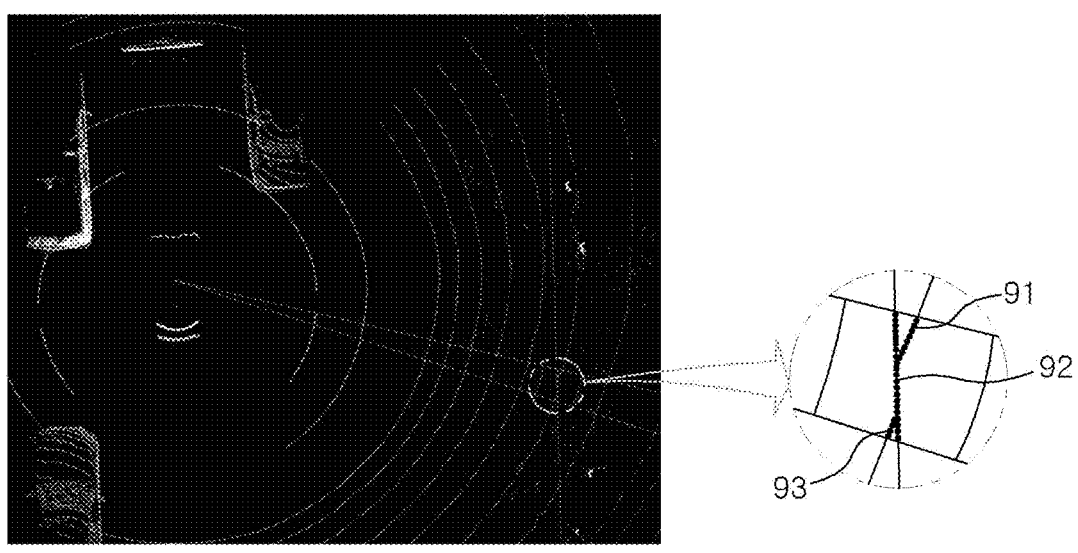
FIG. 9A shows an example of points arranged in the road-curb cell according to the embodiment of the present disclosure.
Figure 9B:
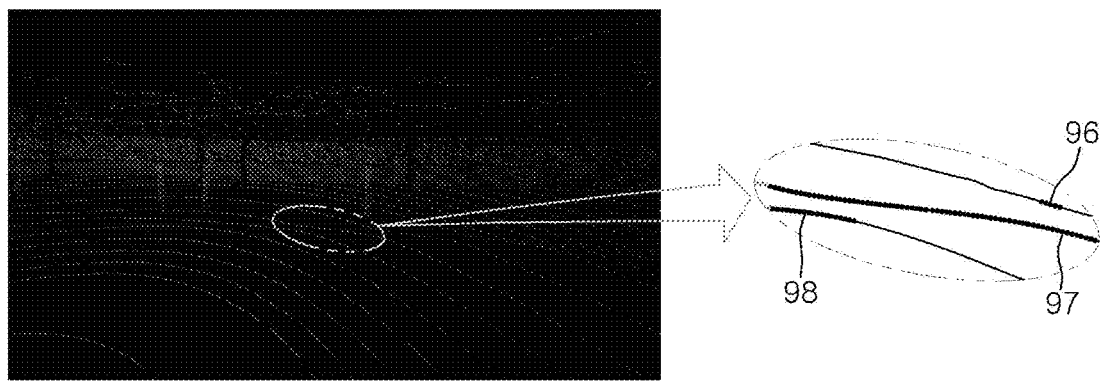
FIG. 9B shows an example of points arranged in the road-curb cell according to the embodiment of the present disclosure.
Figure 10A:
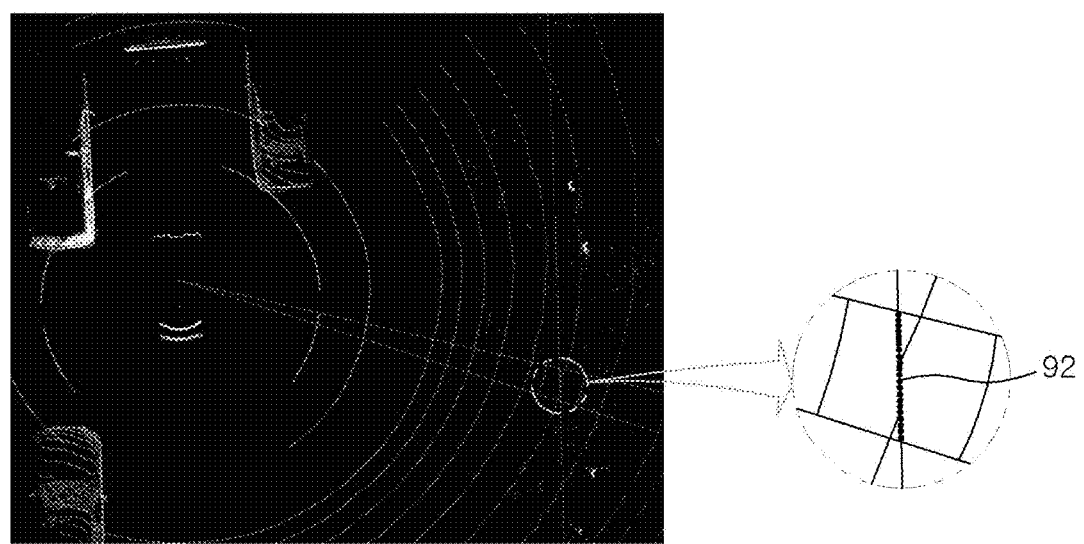
FIG. 10A shows a result of detecting road-curb candidate points by using distribution of heights of points arranged in the road-curb cell according to the embodiment of the present disclosure.
Figure 10B:
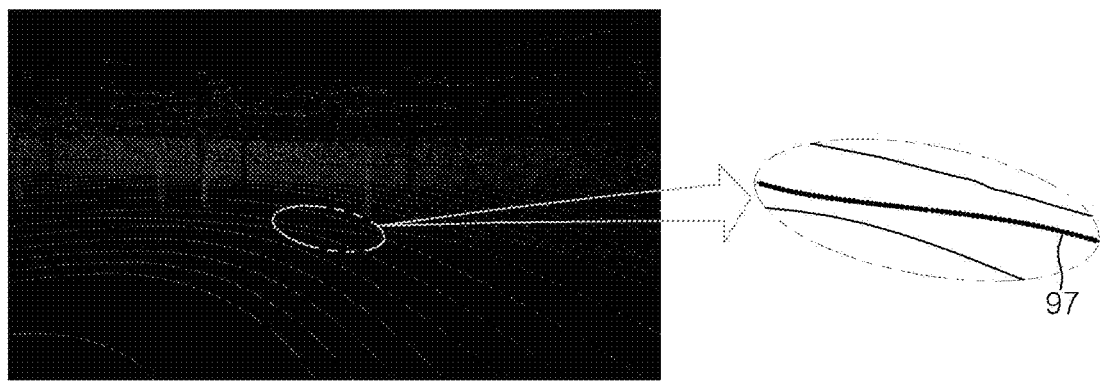
FIG. 10B shows a result of detecting road-curb candidate points by using distribution of heights of points arranged in the road-curb cell according to the embodiment of the present disclosure.

FIGS. 9A and 9B show an example of points arranged in the road-curb cell according to the embodiment of the present disclosure, and FIGS. 10A and 10B show a result of detecting road-curb candidate points by using distribution of heights of points arranged in the road-curb cell according to the embodiment of the present disclosure.

Referring to FIGS. 3, 9A, 9B, 10A and 10B, the road-curb point detecting unit 340 may determine, as a road-curb candidate point, a point having a height within a predetermined range (e.g., a range excluding the top 10% and the bottom 10%) from among points in the road-curb cell by using the distribution of heights of points arranged in the road-curb cell. For example, in FIGS. 9A, 9B, 10A and 10B, reference numerals '92' in FIG. 10A and '97' in FIG. 10B are determined as the road-curb candidate points having heights within the predetermined range among points 91, 92, and 93 in FIG. 9A and points 96, 97, and 98 in FIG. 9B.

This is because that since a point reflected from a road-curb surface and a point reflected from the sidewalk area or the driveway area may be actually arranged together in the road-curb cell, the road-curb point detecting unit 340 may only detect a point whose height is within a predetermined range as the road-curb candidate point. Accordingly, the road-curb detecting program 300 may prevent a case in which a point reflected from the sidewalk or the driveway is erroneously detected as the road-curb.

Figure 11A:
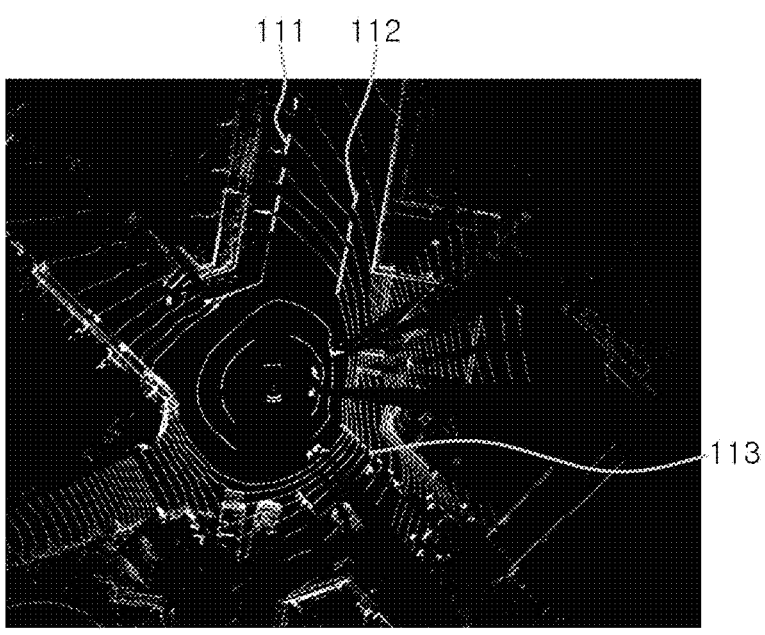
FIG. 11A show a result of fitting a road-curb line through a line fitting algorithm according to the embodiment of the present disclosure.
Figure 11B:
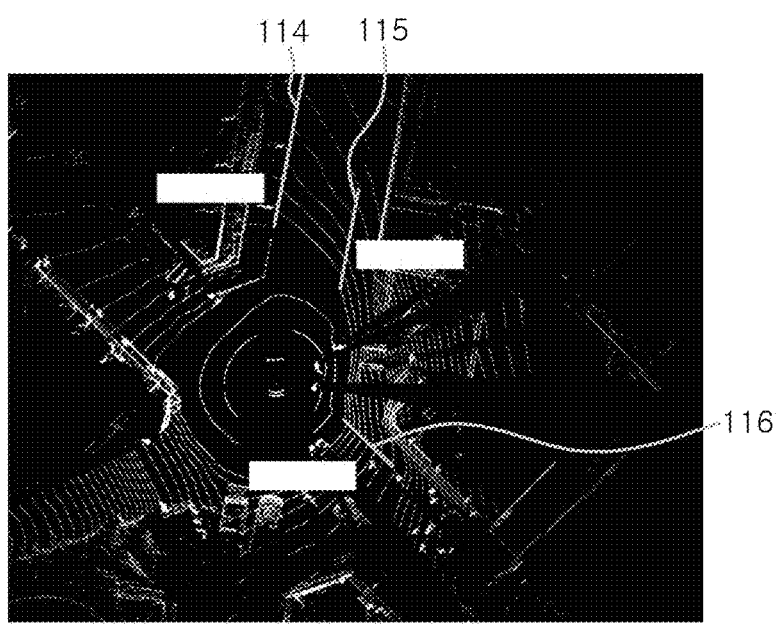
FIG. 11B show a result of fitting a road-curb line through a line fitting algorithm according to the embodiment of the present disclosure.

FIGS. 11A and 11B show a result of fitting a road-curb line through a line fitting algorithm according to the embodiment of the present disclosure.

Referring to FIGS. 3, 11A and 11B, the road-curb line determining unit 350 may arrange road-curb candidate points 111, 112, and 113 in FIG. 11A in a coordinate system, and may perform a line fitting process for determining final road-curb lines 114, 115, and 116 in FIG. 11B by using the road-curb candidate points.

In this case, the road-curb line determining unit 350 may perform the line fitting process for the road-curb candidate points 111, 112, and 113 in FIG. 11A by using a random sample consensus (RANSAC) algorithm.

First, if the number of inlier points is greater than or equal to a predetermined value in the line fitting process, the road-curb line determining unit 350 may obtain a first road-curb line through a first line fitting process.

Thereafter, the road-curb line determining unit 350 may additionally perform a second line fitting process by using remaining road-curb candidate points after removing the inlier points of the first road-curb line from among the road-curb candidate points. Here, if the number of inlier points of the extracted road-curb line is equal to or greater than a predetermined value, the road-curb line determining unit 350 may obtain a second road-curb line, and may repeat the above-described process to detect a plurality of road-curb lines.

If the number of inlier points of the extracted road-curb line is less than the predetermined value, the road-curb line determining unit 350 may end the line fitting process and may detect the determined road-curb line(s) until the end of the line fitting process as the road-curb(s) on the road.

Figure 12:
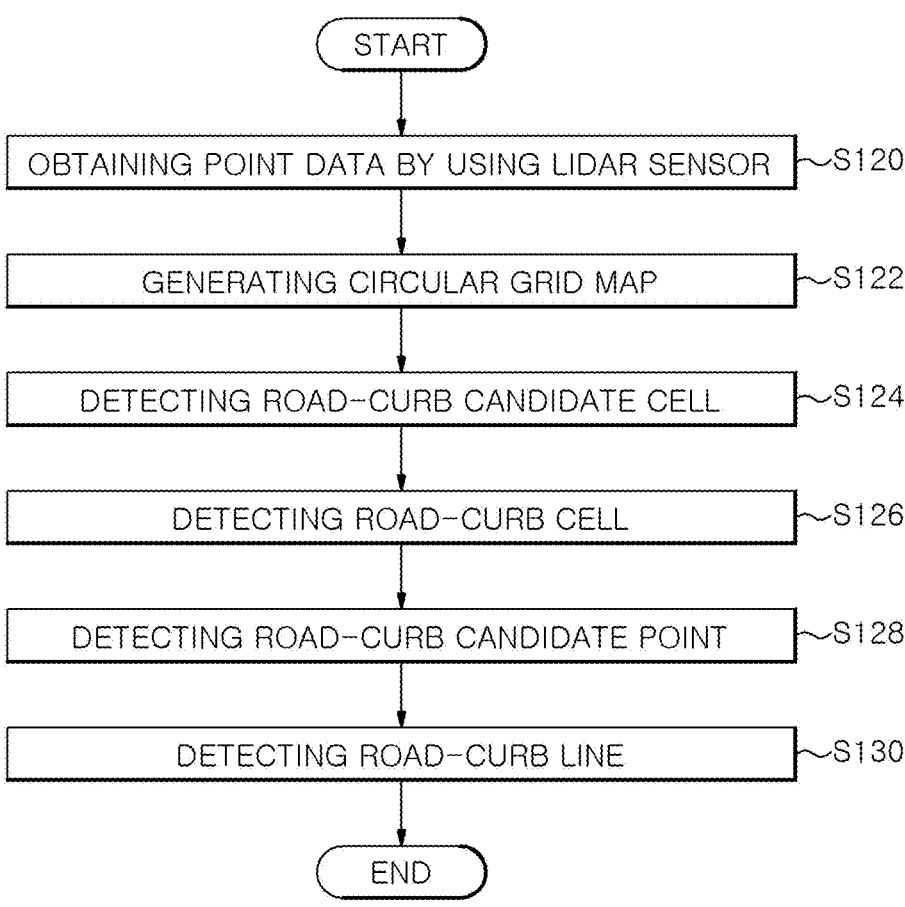
FIG. 12 is a flowchart showing an example of a method in which the road-curb detecting apparatus detects the road-curb according to the embodiment of the present disclosure.

FIG. 12 is a flowchart showing an example of a method in which the road-curb detecting apparatus 100 detects the road-curb according to the embodiment of the present disclosure.

Referring to FIGS. 1, 3, and 12, in step S120, the point data receiving unit 310 receives (obtains) point data from the lidar sensor 20.

In step S122, the circular grid map generating unit 320 generates a circular grid map and arranges the point data in cells into which the circular grid map is divided.

Next, in step S124, the road-curb cell detecting unit 330 detects (determines) a road-curb candidate cell based on a height of a point arranged in each cell.

Then, in step S126, the road-curb cell detecting unit 330 detects (determines) a road-curb cell based on a height of a point arranged in a cell adjacent to the road-curb candidate cell.

Thereafter, in step S128, the road-curb point detecting unit 340 detects (determines) road-curb candidate points from among points arranged in the detected road-curb cell by using distribution of heights of the points arranged in the detected road-curb cell.

Next, in step S130, the road-curb line determining unit 350 detects the road-curb (e.g., road-curb line) on a road by performing a line fitting algorithm on the detected road-curb candidate points.

According to the embodiment of the present disclosure, points are arranged in divided cells on a circular grid map by using the point data received from the lidar sensor 20 to detect a road-curb through a comparison between cells. Since it is not necessary to use information of all received point data, the road-curb is quickly detected. Further, the road-curb may be detected even in an environment in which layer information is unknown. In addition, by using the circular grid map in the embodiment of the present disclosure, the performance of the autonomous driving system may be improved due to an accurate result of detecting the road-curb regardless of a direction of the road-curb.

In other words, the present disclosure may contribute to improving the safety of autonomous driving through accurate road-curb detection and to providing a processing technique suitable for a real-time operation of a control system through rapid data processing.

The combinations of respective blocks of block diagrams and respective sequences of a flow diagram attached herein is carried out by computer program instructions which are executed through various computer means and recorded in a non-transitory computer-readable recording medium. Since the computer program instructions is loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, is stored in a memory unit, which comprises non-transitory computer-readable medium, useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provides operations for executing functions described in the respective blocks of the block diagrams and the respective sequences of the flow diagram. The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. A method of detecting a road-curb that is performed by a road-curb detecting system of a vehicle, the method comprising:

obtaining points around the vehicle using a lidar sensor of the road-curb detecting system by emitting a laser beam in a predetermined direction and receiving a reflected laser beam from an object reflecting the laser beam;

generating a circular grid map and dividing the circular grid map by a predetermined unit distance and a predetermined unit angle to form a plurality of cells;

arranging the points received from the lidar sensor in the plurality of cells;

detecting the road-curb based on the points arranged in the plurality of cells; and upon the detecting of the road-curb, providing a processing technique suitable for a real-time operation of a control system of the vehicle through rapid data processing, wherein the detecting of the road-curb includes:

determining, among the plurality of cells, a first cell in which a difference in heights between points is within a first predetermined range as a road-curb candidate cell;

determining a road-curb cell based on a second cell and a third cell, each of which has a value of an angular component on the circular grid map that is equal to an angular component of the first cell, and providing road-curb information corresponding to the determined road-curb cell to an autonomous driving system of the vehicle, wherein the autonomous driving system controls a movement of the vehicle based on the road-curb information such that the vehicle is prevented from traveling toward a non-road area separated from a road area by the determined road-curb cell, wherein the determining of the road-curb cell includes:

selecting a cell having a value of a radius component on the circular grid map that is smaller than a value of a radius component of the first cell as the second cell;

selecting another cell having a value of a radius component on the circular grid map that is greater than the value of the radius component of the first cell as the third cell; and determining the first cell as the road-curb cell if a height difference between a point having a height lower than any other cells in the second cell and a point having a height lower than any other cells in the third cell is within a second predetermined range.

2. The method of claim 1, wherein the second cell and the third cell are adjacent to the first cell.

3. The method of claim 1, wherein a distance between the second cell and the third cell is shorter than or equal to a predetermined distance.

4. The method of claim 1, wherein the detecting of the road-curb further includes determining, as road-curb candidate points, points respectively having heights within a third predetermined range among points arranged in the road-curb cell.

5. The method of claim 4, wherein the detecting of the road-curb further includes:

performing a first line fitting process using the road-curb candidate points, and detecting a first road-curb using first points that are inlier points obtained in the first line fitting process if a number of the first points is greater than or equal to a predetermined value.

6. The method of claim 5, wherein the detecting of the road-curb further includes:

performing a second line fitting process using second points remaining after removing the first points from among the road-curb candidate points, and detecting a second road-curb using third points that are inlier points obtained in the second line fitting process if a number of the third points is greater than or equal to the predetermined value.

7. A non-transitory computer-readable storage medium including computer-executable instructions which cause, when executed by a processor, the processor to perform a method of detecting a road-curb that is performed by a road-curb detecting system of a vehicle, the method including:

obtaining points around the vehicle using a lidar sensor of the road-curb detecting system by emitting a laser beam in a predetermined direction and receiving a reflected laser beam from an object reflecting the laser beam;

generating a circular grid map and dividing the circular grid map by a predetermined unit distance and a predetermined unit angle to form a plurality of cells;

arranging the points received from the lidar sensor in the plurality of cells;

detecting the road-curb based on the points arranged in the plurality of cells;

upon the detecting of the road-curb, providing a processing technique suitable for a real-time operation of a control system of the vehicle through rapid data processing, wherein the detecting of the road-curb includes:

determining, among the plurality of cells, a first cell in which a difference in heights between points is within a first predetermined range as a road-curb candidate cell;

determining a road-curb cell based on a second cell and a third cell, each of which has a value of an angular component on the circular grid map that is equal to an angular component of the first cell, and providing road-curb information corresponding to the determined road-curb cell to an autonomous driving system of the vehicle, wherein the autonomous driving system controls a movement of the vehicle based on the road-curb information such that the vehicle is prevented from traveling toward a non-road area separated from a road area by the determined road-curb cell, wherein the determining of the road-curb cell includes:

selecting a cell having a value of a radius component on the circular grid map that is smaller than a value of a radius component of the first cell as the second cell;

selecting another cell having a value of a radius component on the circular grid map that is greater than the value of the radius component of the first cell as the third cell; and determining the first cell as the road-curb cell if a height difference between a point having the smallest height in the second cell and a point having the smallest height in the third cell is within a second predetermined range.

8. The non-transitory computer-readable storage medium of claim 7, wherein the second cell and the third cell are adjacent to the first cell.

9. The non-transitory computer-readable storage medium of claim 7, wherein a distance between the second cell and the third cell is shorter than or equal to a predetermined distance.

10. The non-transitory computer-readable storage medium of claim 7, wherein the detecting of the road-curb further includes determining, as road-curb candidate points, points respectively having heights within a third predetermined range among points arranged in the road-curb cell.

11. The non-transitory computer-readable storage medium of claim 10, wherein the detecting of the road-curb further includes:

performing a first line fitting process using the road-curb candidate points, and detecting a first road-curb using first points that are inlier points obtained in the first line fitting process if a number of the first points is greater than or equal to a predetermined value.

12. The non-transitory computer-readable storage medium of claim 11, wherein the detecting of the road-curb further includes:

performing a second line fitting process using second points remaining after removing the first points from among the road-curb candidate points, and detecting a second road-curb using third points that are inlier points obtained in the second line fitting process if a number of the third points is greater than or equal to the predetermined value.

13. A road-curb detecting system of a vehicle, the system comprising:

a lidar sensor of the vehicle for obtaining points around the vehicle; and a road-curb detecting apparatus communicatively coupled with the lidar sensor which emits a laser beam in a predetermined direction and receives a reflected laser beam from an object reflecting the laser beam and the road-curb detecting apparatus for generating a circular grid map and dividing the circular grid map by a predetermined unit distance and a predetermined unit angle to form a plurality of cells and for arranging the points received from the lidar sensor in the plurality of cells, for detecting a road-curb based on the points arranged in the plurality of cells, and, upon the detecting of the road-curb, for providing a processing technique suitable for a real-time operation of a control system of the vehicle through rapid data processing, wherein the detecting of the road-curb includes:

determining, among the plurality of cells, a first cell in which a difference in heights between points is within a first predetermined range as a road-curb candidate cell;

determining a road-curb cell based on a second cell and a third cell, each of which has a value of an angular component on the circular grid map that is equal to an angular component of the first cell, and providing road-curb information corresponding to the determined road-curb cell to an autonomous driving system of the vehicle, wherein the autonomous driving system controls a movement of the vehicle based on the road-curb information such that the vehicle is prevented from traveling toward a non-road area separated from a road area by the determined road-curb cell, wherein the determining of the road-curb cell includes:

selecting a cell having a value of a radius component on the circular grid map that is smaller than a value of a radius component of the first cell as the second cell;

selecting another cell having a value of a radius component on the circular grid map that is greater than the value of the radius component of the first cell as the third cell; and determining the first cell as the road-curb cell if a height difference between a point having the smallest height in the second cell and a point having the smallest height in the third cell is within a second predetermined range.

14. The road-curb detecting system of claim 13, wherein, in the detecting of the road-curb, the road-curb detecting apparatus further determines, as road-curb candidate points, points respectively having heights within a third predetermined range among points arranged in the road-curb cell.

* * * * *